United States Patent
Araki (10) Patent No.: US 9,307,108 B2
(45) Date of Patent: Apr. 5, 2016

(54) INFORMATION PROCESSING SYSTEM AND INFORMATION PROCESSING METHOD

(71) Applicant: Ryoji Araki, Fukuoka (JP)

(72) Inventor: Ryoji Araki, Fukuoka (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 14/627,142

(22) Filed: Feb. 20, 2015

(65) Prior Publication Data

US 2015/0264211 A1 Sep. 17, 2015

(30) Foreign Application Priority Data

Mar. 14, 2014 (JP) .................................. 2014-051847

(51) Int. Cl.
| | |
|---|---|
| G06F 3/12 | (2006.01) |
| G06Q 10/10 | (2012.01) |
| H04N 1/00 | (2006.01) |
| G06F 9/445 | (2006.01) |
| H04N 1/32 | (2006.01) |

(52) U.S. Cl.
CPC .............. *H04N 1/00938* (2013.01); *G06F 8/61* (2013.01); *H04N 1/00347* (2013.01); *H04N 1/00973* (2013.01); *H04N 1/32106* (2013.01); *H04N 2201/001* (2013.01); *H04N 2201/0094* (2013.01)

(58) Field of Classification Search
USPC ........... 358/1.15, 468, 400; 709/204; 455/420
See application file for complete search history.

(56) References Cited

U.S. PATENT DOCUMENTS

| | | | |
|---|---|---|---|
| 2006/0215201 A1 | 9/2006 | Shimizu et al. | |
| 2007/0008583 A1 | 1/2007 | Araki | |
| 2008/0209569 A1 | 8/2008 | Araki | |
| 2009/0070505 A1* | 3/2009 | Krueger | .................. H04L 12/66 710/107 |
| 2009/0265701 A1 | 10/2009 | Naslavsky et al. | |
| 2010/0262701 A1* | 10/2010 | Odakura | ................. H04L 67/14 709/228 |
| 2011/0041144 A1 | 2/2011 | Araki | |
| 2011/0225600 A1 | 9/2011 | Araki | |
| 2011/0231864 A1* | 9/2011 | Raj | ......................... G06F 9/541 719/321 |
| 2012/0180044 A1* | 7/2012 | Donnellan | .......... H04L 61/2007 718/1 |
| 2012/0198438 A1 | 8/2012 | Auer | |
| 2012/0212779 A1 | 8/2012 | Araki | |
| 2012/0216062 A1 | 8/2012 | Araki | |
| 2012/0304176 A1* | 11/2012 | Takeda | ................ G06F 9/45533 718/1 |
| 2013/0195094 A1* | 8/2013 | Kubo | .................. H04W 56/001 370/338 |
| 2013/0254903 A1 | 9/2013 | Araki | |
| 2013/0258385 A1 | 10/2013 | Shimizu et al. | |

(Continued)

FOREIGN PATENT DOCUMENTS

JP 2011-182461 9/2011

OTHER PUBLICATIONS

Extended European Search Report dated Jul. 27, 2015.

*Primary Examiner* — Jerome Grant, II
(74) *Attorney, Agent, or Firm* — IPUSA, PLLC (57) ABSTRACT

An information processing system includes a first information processing apparatus and a second information processing apparatus that are interconnected via a network. The first information processing apparatus includes an input unit configured to input a group of programs, a first install unit configured to install a first program of the input group of programs onto the first information processing apparatus, and a transmission unit configured to transmit a second program of the input group of programs to the second information processing apparatus. The second information processing apparatus includes a second install unit configured to install the second program transmitted from the transmission unit onto the second information processing apparatus.

12 Claims, 7 Drawing Sheets

(56) References Cited

U.S. PATENT DOCUMENTS

| | | | | |
|---|---|---|---|---|
| 2013/0325949 A1* | 12/2013 | Virani | ............ | G06F 9/541 |
| | | | | 709/204 |
| 2014/0229931 A1 | 8/2014 | Araki | | |
| 2015/0163337 A1* | 6/2015 | Tsukamoto | ...... | G06F 9/44505 |
| | | | | 455/420 |
| 2015/0172923 A1* | 6/2015 | Osaki | ............ | H04W 12/06 |
| | | | | 726/7 |
| 2015/0188855 A1* | 7/2015 | Liu | ............ | H04L 12/58 |
| | | | | 709/206 |
| 2015/0205552 A1* | 7/2015 | Sasase | ............ | G06F 3/1255 |
| | | | | 358/1.15 |
| 2015/0219749 A1* | 8/2015 | Dua | ............ | G01S 13/878 |
| | | | | 455/456.1 |

* cited by examiner

INFORMATION PROCESSING SYSTEM AND INFORMATION PROCESSING METHOD

BACKGROUND OF THE INVENTION

1. Field of the Invention

The present invention relates to an information processing system and an information processing method.

2. Description of the Related Art

Information processing systems are known that are configured to provide one service through cooperation of a plurality of information processing apparatuses. For example, Japanese Laid-Open Patent Publication No. 2011-182461 discloses an information processing system including an information processing apparatus that cooperates with an image forming apparatus to control and manage an application executed in an application execution environment.

SUMMARY OF THE INVENTION

An aspect of the present invention relates to improving efficiency in installing a program on an information processing apparatus that cooperates with another information processing apparatus to execute a process.

According to one embodiment of the present invention, an information processing system is provided that includes a first information processing apparatus and a second information processing apparatus that are interconnected via a network. The first information processing apparatus includes an input unit configured to input a group of programs, a first install unit configured to install a first program of the input group of programs onto the first information processing apparatus, and a transmission unit configured to transmit a second program of the input group of programs to the second information processing apparatus. The second information processing apparatus includes a second install unit configured to install the second program transmitted from the transmission unit onto the second information processing apparatus.

DESCRIPTION OF THE PREFERRED EMBODIMENTS

In the following, embodiments of the present invention are described with reference to the accompanying drawings.

A client-server system is an example of an information processing system that is configured to provide a service through cooperation of a plurality of information processing apparatuses.

In such an information processing system, programs are installed on the information processing apparatuses according to their functions and roles, for example.

However, identifying a program to be installed on each information processing apparatus according to its function or role and installing the identified program on each information processing apparatus may be a rather cumbersome procedure for an operator.

In view of the above, an aspect of the present invention relates to improving efficiency in installing a program on an information processing apparatus that cooperates with another information processing apparatus to execute a process.

Figure 1:
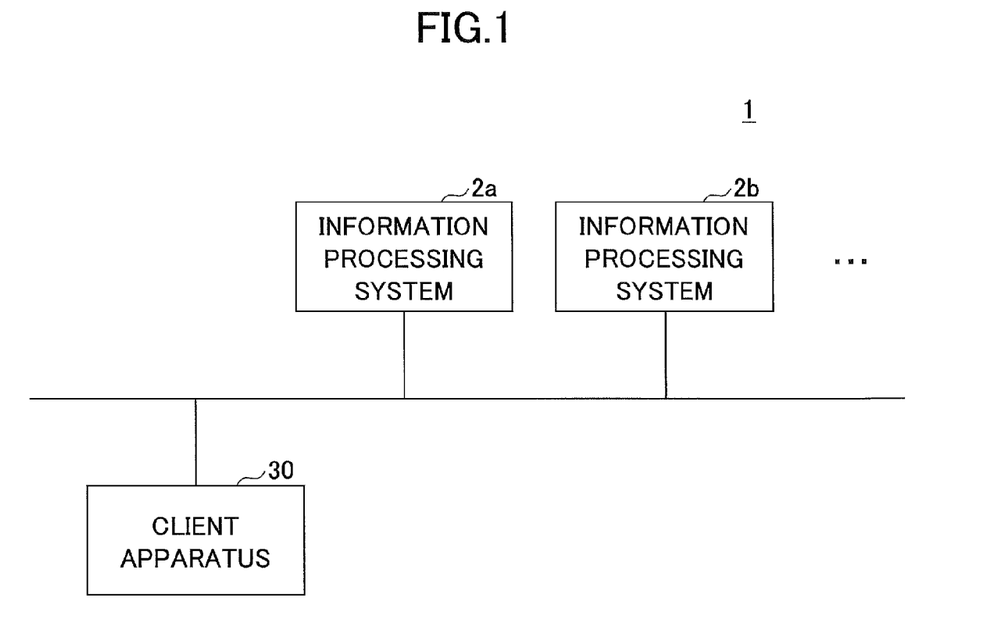
FIG. 1 illustrates an exemplary configuration of an install system according to an embodiment of the present invention.

FIG. 1 illustrates an exemplary configuration of an install system 1 according to an embodiment of the present invention. In FIG. 1, the install system 1 includes a client apparatus 30 and one or more information processing systems 2 such as information processing systems 2a and 2b that are interconnected by a network such as a LAN (Local Area Network) or the Internet. Note that in the descriptions below, the information processing systems 2a and 2b may be referred to as "information processing system 2" when their distinction is not particularly relevant.

The client apparatus 30 may be a device such as a PC (Personal Computer), a tablet terminal, a smartphone, or a mobile phone that is used by a user to install a program on the information processing system 2.

The information processing system 2 includes two or more information processing apparatuses that cooperate with each other to execute a process.

Figure 2:
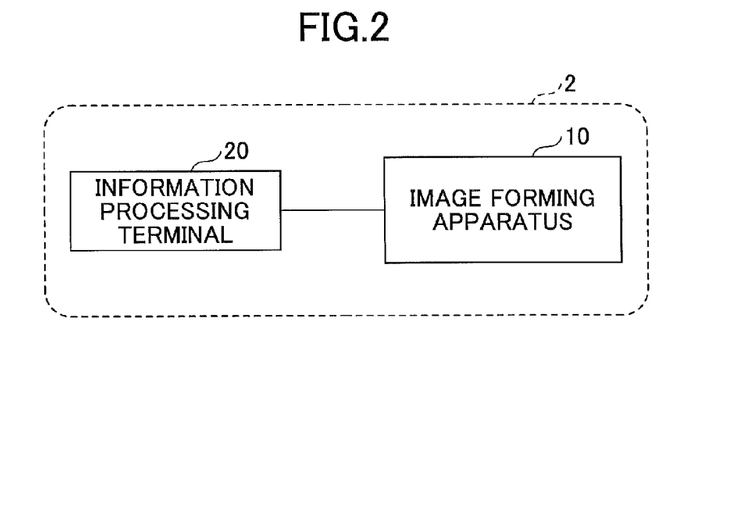
FIG. 2 illustrates an exemplary configuration of an information processing system according to an embodiment of the present invention.

FIG. 2 illustrates an exemplary configuration of the information processing system 2 according to an embodiment of the present invention. In FIG. 2, the information processing system 2 includes an image forming apparatus 10 and an information processing terminal 20 that are interconnected so that they may establish communication with each other. The communication between the image forming apparatus 10 and the information processing terminal 20 may be established, for example, via a USB (Universal Serial Bus), short range wireless communication, or a network such as a LAN (which may be wired or wireless).

In the present embodiment, the image forming apparatus 10 is a multifunction peripheral that implements at least two functions such as printing, scanning, copying, and/or facsimile transmission/reception within a single housing. Note, however, that the image forming apparatus 10 may alternatively be a device implementing a single function, for example. Also, in some embodiments, a device such as a projector, a video conference system, or a digital camera may be used instead of the image forming apparatus 10.

The information processing terminal 20 is an electronic device such as a smartphone or a tablet terminal that is capable of independently executing a discrete information processing operation. In the present embodiment, the information processing terminal 20 functions as an operation unit of the image forming apparatus 10. Specifically, the information processing terminal 20 is connected to the image forming apparatus 10 to be used in place of an operation panel that is typically arranged in the image forming apparatus 10 as a dedicated operation unit for the image forming apparatus 10. Note that in the descriptions below, the term "operation panel" is used to refer to such a dedicated operation unit arranged in the image forming apparatus 10.

The information processing terminal 20 may be arranged at a predetermined position with respect to the image forming apparatus 10 (e.g. position where the operation panel is arranged), for example. In this way, the information processing terminal 20 and the image forming apparatus 10 may be regarded as one single apparatus. Also, the information processing terminal 20 may be detachable from the image forming apparatus 10. When the information processing terminal 20 is detached from the image forming apparatus 10, the information processing terminal 20 may function as an operation unit of the image forming apparatus 10 via wireless communication using Bluetooth (registered trademark), infrared communication, or a wireless LAN, for example.

Figure 3:
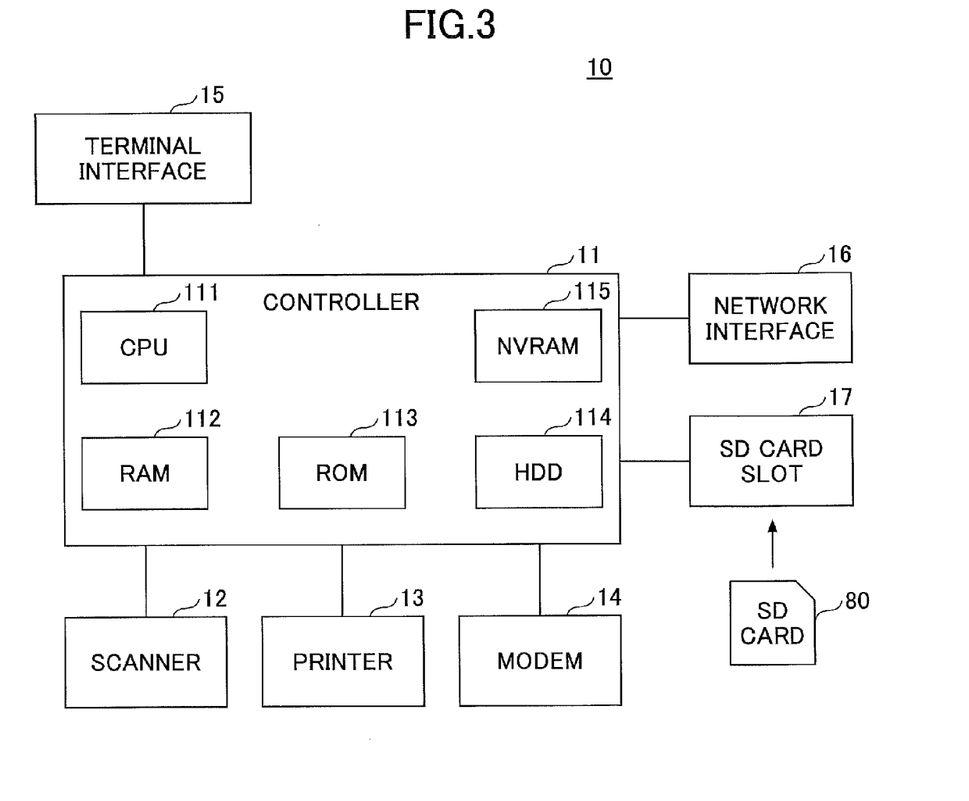
FIG. 3 illustrates an exemplary hardware configuration of an image forming apparatus according to an embodiment of the present invention.

FIG. 3 illustrates an exemplary hardware configuration of the image forming apparatus 10 according to an embodiment of the present invention. In FIG. 3, the image forming apparatus 10 includes a controller 11, a scanner 12, a printer 13, a modem 14, a terminal interface 15, a network interface 16, and an SD card slot 17 as hardware elements.

The controller 11 includes a CPU (Central Processing Unit) 111, a RAM (Random Access Memory) 112, a ROM (Read-Only Memory) 113, a HDD (Hard Disk Drive) 114, and a NVRAM (Non-Volatile RAM) 115. The ROM 113 stores various programs and data to be used by the various programs, for example. The RAM 112 is used as a storage area for loading a program and as a working area of the loaded program. The CPU 111 executes the program loaded in the RAM 112 to implement various functions. The HDD 114 stores the programs and various data to be used by the programs, for example. The NVRAM 115 stores various setting information.

The scanner 12 is hardware (image scanning unit) for scanning image data from a document. The printer 13 is hardware (print unit) for printing out print data on a print sheet. The modem 14 is hardware for establishing connection with a telephone line and is used to transmit/receive image data via facsimile communication. The terminal interface 15 is an interface for establishing communication (connection) with the information processing terminal 20. For example, the terminal interface 15 may be a USB interface or hardware for establishing short range wireless communication. In other examples, the terminal interface 15 may be hardware for establishing connection with a network such as a LAN (which may be wireless or wired). The network interface 16 is hardware for establishing connection with a network such as the LAN (which may be wireless or wired). The SD card slot 17 is used to read a program stored in an SD card 80. That is, in the image forming apparatus 10, a program stored in the ROM 113 as well as a program stored in the SD card 80 may be loaded in the RAM 112 and executed. Note that a recording medium other than the SD card 80 such as a CD-ROM or a USB memory may be used instead of the SC card 80. That is, the type of recording medium that may be used to implement the function of the SD card 80 in the image forming apparatus 10 is not particularly limited. In this case, the SD card slot 17 may be replaced by suitable hardware according to the type of recording medium used.

Figure 4:
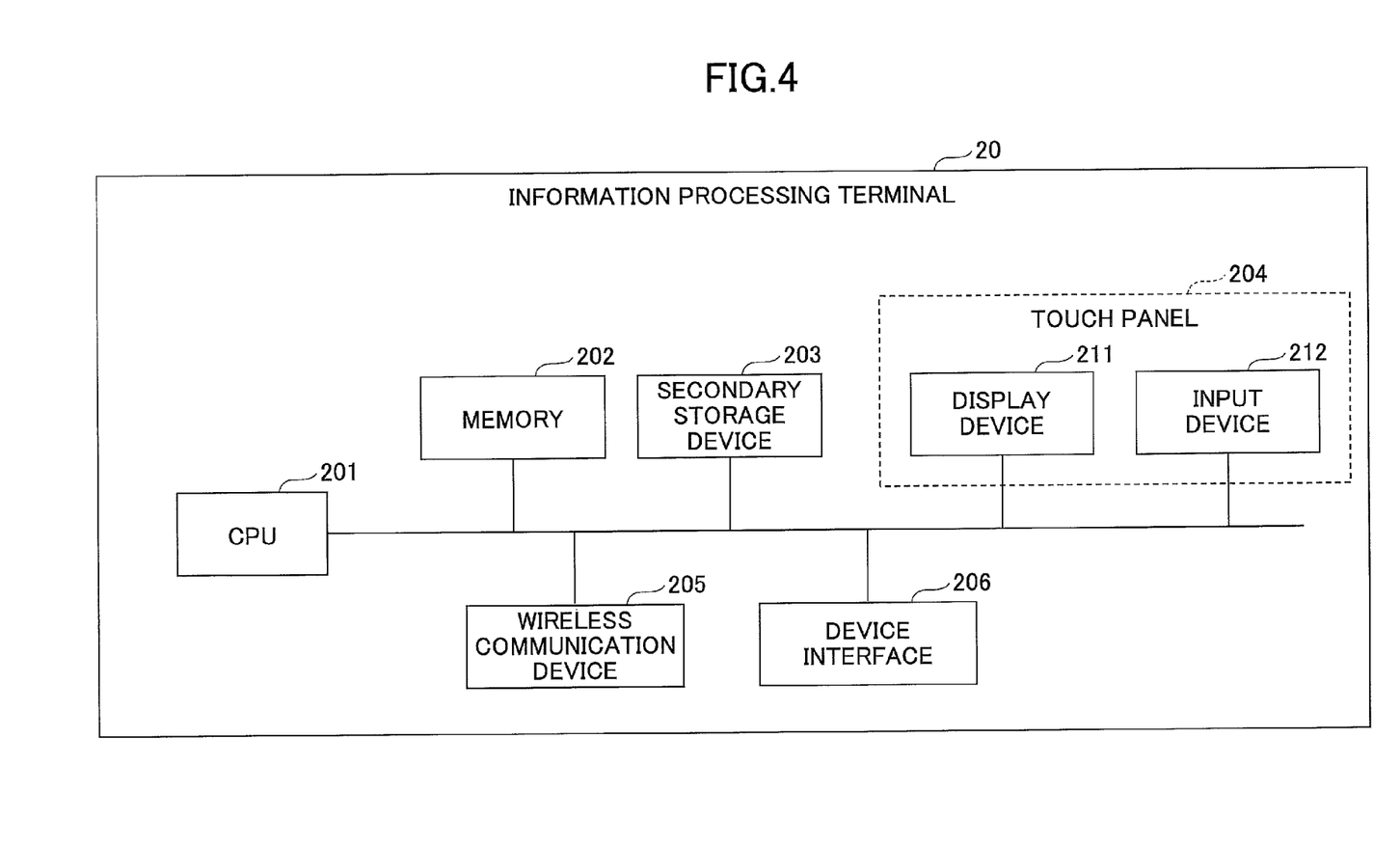
FIG. 4 illustrates an exemplary hardware configuration of an information processing terminal according to an embodiment of the present invention.

FIG. 4 illustrates an exemplary hardware configuration of the information processing terminal 20 according to an embodiment of the present invention. In FIG. 4, the information processing terminal 20 includes a CPU 201, a memory 202, a secondary storage device 203, a touch panel 204, a wireless communication device 205, and a device interface 206.

The secondary storage device 203 stores a program installed in the information processing terminal 20, for example. The memory 202 reads a program stored in the secondary storage device 203 upon receiving an instruction to start the program and temporarily stores the program read from the secondary storage device 203. The CPU 201 implements functions of the information processing terminal 20 according to the program stored in the memory 202.

The touch panel 204 is an electronic device having both an input function and a display function and is configured to display information and accept an input from a user, for example. The touch panel 204 includes a display device 211 and an input device 212.

The display device 211 may be a liquid crystal display (LCD), for example, and is configured to implement the display function of the touch panel 204. The input device 212 is an electronic device including a sensor for detecting contact of an object that comes into contact with the display device 211. Note that the method used for detecting the object coming into contact with the display device 211 may be any suitable method such as an electrostatic method, a resistance film method, or an optical method, for example. Note that the object detected by the sensor of the input device 212 may be an object that comes into contact with the surface (contact surface) of the touch panel 204. Examples of such an object include a user's finger and a dedicated/general pen.

The wireless communication device 205 includes an electronic device such as an antenna for establishing communication in a wireless LAN or a mobile communications network, for example. The device interface 206 is an interface for establishing communication with the image forming apparatus 10. That is, the device interface 206 establishes communication with the image forming apparatus 10 according to the configuration of the terminal interface 15.

Figure 5:
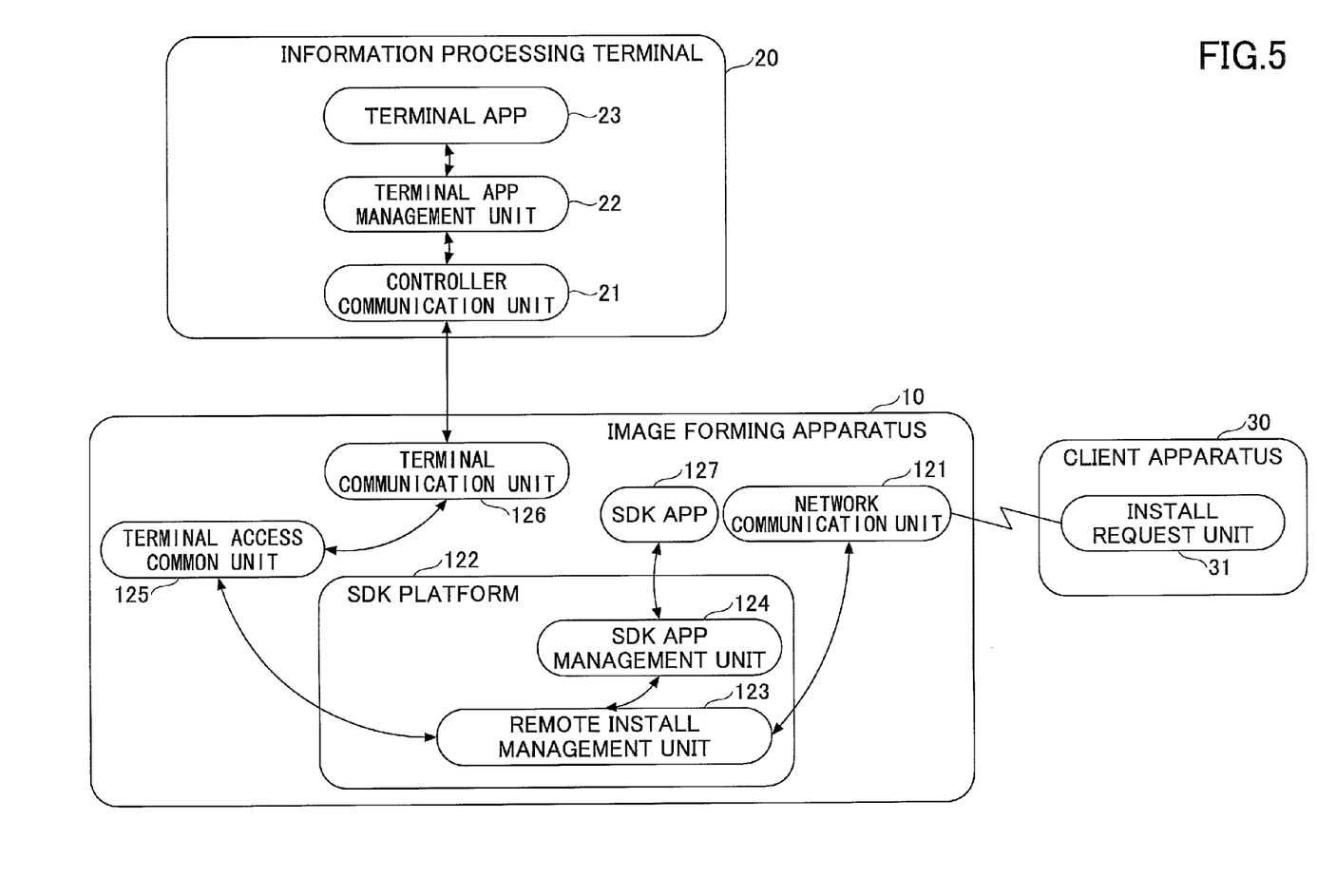
FIG. 5 illustrates an exemplary functional configuration of an install system according to an embodiment of the present invention.

FIG. 5 illustrates an exemplary functional configuration of an install system according to an embodiment of the present invention. In FIG. 5, the client apparatus 30 includes an install request unit 31. The install request unit 31 transmits to the image forming apparatus 10 an install request including, for example, an application program for prompting the image forming apparatus 10 to execute a process according to an instruction from a user (SDK app 127 described below) and an application program for prompting the information processing terminal 20 to execute a process (terminal app 23 described below). That is, in the present embodiment, one install request may include the SDK app (software development kit application) 127 and the terminal app 23. Note, however, that in the present embodiment, the SDK app 127 and the terminal app 23 do not necessarily have to be transmitted at the same time. That is, in some embodiments, the SDK app 127 and the terminal app 23 that are associated with one install request may be transmitted separately.

The SDK app 127 and the terminal app 23 that are associated with one install request may prompt the image forming apparatus 10 or the information processing terminal 20 to execute a cooperative process of cooperating with each other, and in this way, the image forming apparatus 10 and the information processing terminal 20 may implement a cooperative service.

The image forming apparatus 10 includes a network communication unit 121, an SDK platform 122, a terminal access common unit 125, and a terminal communication unit 126. These functional features may be implemented by the CPU 111 executing one or more relevant programs installed on the image forming apparatus 10, for example.

The network communication unit 121 controls communication with the client apparatus 30. For example, the network communication unit 121 may receive an application program install request transmitted from the client apparatus 30.

The SDK platform 122 includes an API (Application Program Interface) for developing the SDK app 127 and a management function for managing the SDK app 127. Note that the API may be in the form of a function, an object-oriented class, or a method of the class, for example. In the following descriptions, an API provided by the SDK platform 122 is referred to as "SDKAPI". For example, the SDK platform 122 may provide an SDKAPI of a scan function, an SDKAPI of a print function, and an SDKAPI of a copy function to the SDK app 127. The SDK platform 122 is configured to control the image forming apparatus 10 according to the SDKAPI called by the SDK app 127. The SDK platform 122 may include Java (registered trademark) and Virtual Machine (VM). In this case, the SDK app 127 may be written (developed) in Java (registered trademark) language. The SDKAPI may be published so that a third party may also develop the SDK app 127, for example.

The SDK app 127 is an application program (aka a "plug-in") that may be additionally installed to expand the functions of the image forming apparatus 10 after shipment of the image forming apparatus 10. The SDK app 127 is configured to prompt the image forming apparatus 10 to execute a predetermined process (process installed in the SDK app 127) via the SDK platform 122.

Note that in the present embodiment, for the sake of convenience, the SDK app 127 and the SDK platform 122 are illustrated as exemplary programs that can be installed onto the image forming apparatus 10. However, programs that can be installed onto the image forming apparatus 10 are not limited to the SDK app 127 and the SDK platform 122. That is, a program other than the SDK app 127 and the SDK platform 122 may be installed onto the image forming apparatus 10. Examples of programs that can be installed onto the image forming apparatus 10 generally encompass all types of programs that are installed on an image forming apparatus.

In FIG. 5, the SDK platform 122 includes a remote install management unit 123 and an SDK app management unit 124. The remote install management unit 123 controls a process according to an install request transmitted from the client apparatus 30. For example, the remote install management unit 123 may transmit a request to the SDK app management unit 124 to install the SDK app 127 that is included in a group of application programs that are specified in the install request from the client apparatus 30 (also referred to as "group of programs" or "install package file"). Also, the remote install management unit 123 may execute a process of requesting the information processing terminal 20 to install the terminal app 23 included in the group of programs specified in the install request.

The SDK app management unit 124 that receives the request from the remote install management unit 123 installs the SDK app 127 onto the image forming apparatus 10. Note that a plurality of types of the SDK app 127 may be installed onto the image forming apparatus 10.

The terminal access common unit 125 includes an interface for receiving a request directed to the information processing terminal 20 from the various units of the image forming apparatus 10. The terminal access common unit 125 executes a process according to a request called via its interface. For example, the terminal access common unit 125 may receive an install request for installing the terminal app 23 from the remote install management unit 123.

The terminal communication unit 126 controls communication with the information processing terminal 20. The terminal communication unit 126 may establish communication with the information processing terminal 20 using HTTP (HyperText Transfer Protocol), for example. Note, however, that the communication protocol used to establish communication between the image forming apparatus 10 and the information processing terminal 20 is not limited to HTTP. In the present embodiment, the terminal communication unit 126 transmits an install request for installing the terminal app 23 to the information processing terminal 20.

The information processing terminal 20 includes a controller communication unit 21 and a terminal app management unit 22. The controller communication unit 21 controls communication with the image forming apparatus 10 (strictly speaking, the controller 11). For example, the controller communication unit 21 may receive an install request for installing the terminal app 23 from the image forming apparatus 10. In response to the install request for installing the terminal app 23, the terminal app management unit 22 may install the terminal app 23 that is received in association with the install request onto the information processing terminal 20. Note that a plurality of types of the terminal app 23 may be installed onto the information processing terminal 20. For example, the terminal app 23 may be an application program that is installed on the information processing terminal 20 to reflect display control operations of the operation panel implemented by the SDK app 127 and may be configured to be capable of providing an expressive GUI (Graphical User Interface) with desired operability.

Figure 6:
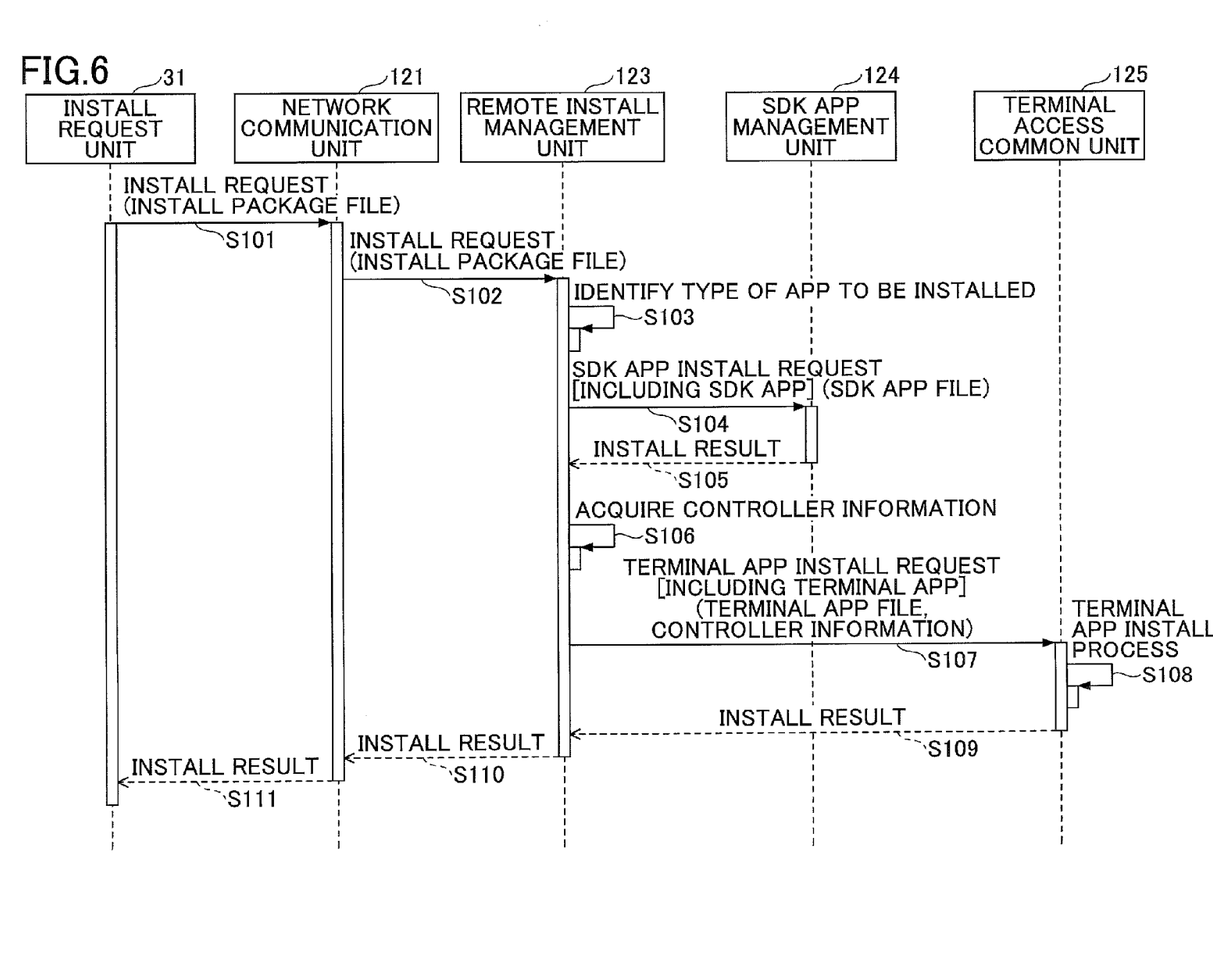
FIG. 6 is a sequence chart illustrating exemplary process steps executed by a client apparatus and the image forming apparatus.

In the following, process steps executed in the install system 1 of the present embodiment are described. FIG. 6 is a sequence chart illustrating exemplary process steps executed by the client apparatus 30 and the image forming apparatus 10.

In step S101, the install request unit 31 of the client apparatus 30 transmits an install request including an install package file to the image forming apparatus 10. The install package file is an archive file that includes application programs to be installed, for example.

Figure 7:
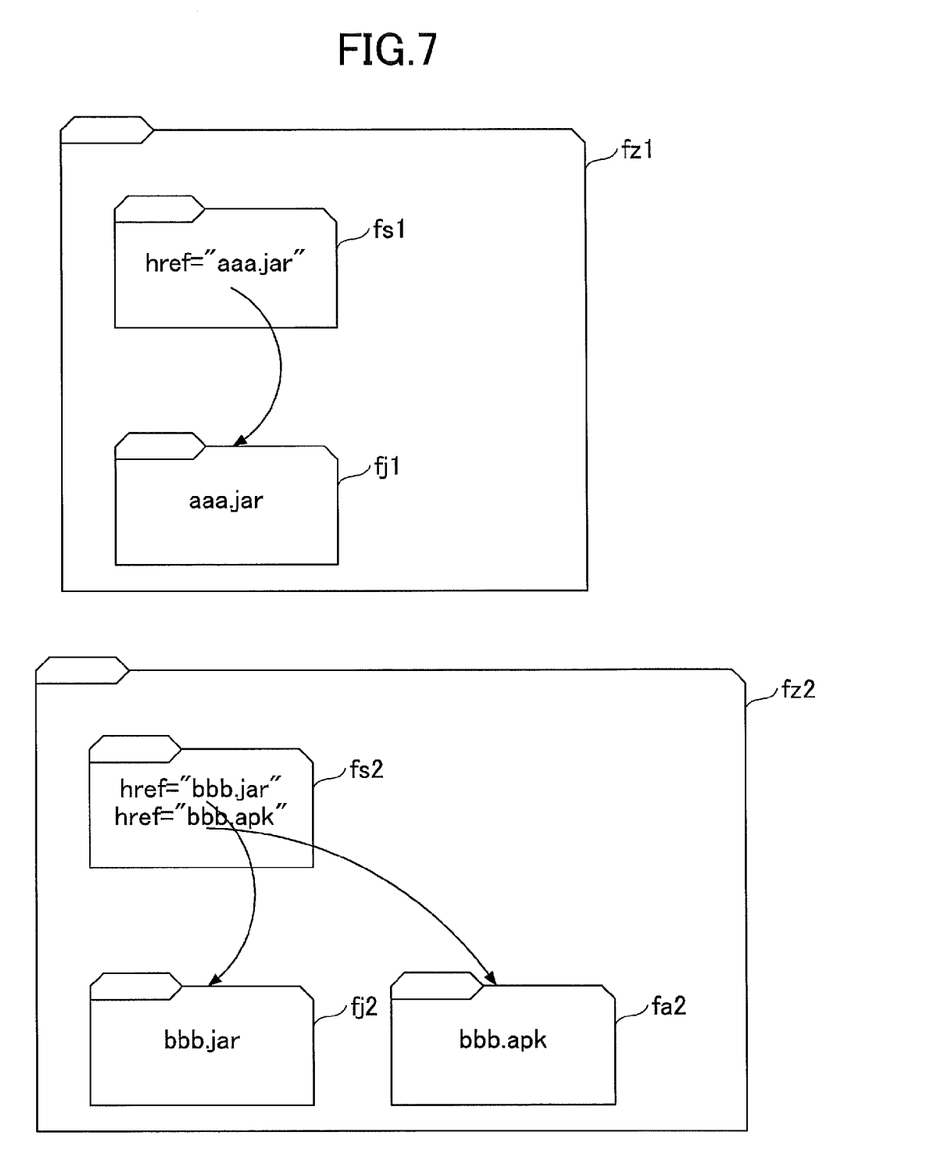
FIG. 7 illustrates an exemplary configuration of an install package file.

FIG. 7 illustrates an exemplary configuration of an install package file. In FIG. 7, two exemplary configurations of install package files, namely, an install package file fz1 and an install package file fz2, are illustrated. Note that one install package file includes one configuration file and one or more app files. The configuration file is a file that stores a list of file names of app files that are included in the install package file, for example. The app file is a file that stores an application program. In the following descriptions, the app file that stores the SDK app 127 is referred to as "SDK app file" and the app file that stores the terminal app 23 is referred to as "terminal app file".

The install package file fz1 includes a configuration file fs1 and an SDK app file fj1 that contains one SDK app 127. Thus, the file name of the SDK application file fj1 ("aaa.jar") is described in the configuration file fs1.

On the other hand, the install package file fz2 includes a configuration file fs2, an SDK app file fj2 that stores one SDK app 127, and a terminal app file fa2 that stores one terminal app 23. Thus, the file name of the SDK app file fj2 ("bbb.jar") and the file name of the terminal app file fa2 ("bbb.apk") are described in the configuration file fs2.

As described above, there may be install package files that only include the SDK app 127, and install package files that include both the SDK app 127 and the terminal app 23. Note that in some embodiments, the configuration file may include attribute information other than the file name of the app files storing the application programs included in the install file package. For example, an ID and a developer name of each application program may be included in the configuration file. Alternatively, attribute information of an application program may be included in the app file storing the relevant application program. Also, note that in some embodiments, the configuration file does not necessarily have to be included in the install package file. That is, the file name of each app file may be identified by analyzing the install package file, for example.

The install package file is created for each application product. The user operates the client device 30 to select the install package file to be installed and the image forming apparatus 10 into which the install package file is to be installed. The install request unit 31 transmits an install request including the install package file selected by the user to the selected image forming apparatus 10 (step S101). Note that the install package file may be stored in the client apparatus 30 or downloaded to the install request unit 31 via a network, for example.

The install request from the install request unit 31 is received by the network communication unit 121 of the image forming apparatus 10. The network communication unit 121 conveys the received install request to the remote install management unit 123 (step S102). Then, the remote install management unit 123 refers to a configuration file that is obtained by analyzing the install package file, and identifies the app type of the application program to be installed (step S103). The app type is an example of information indicating an install destination of each program. The app type is a concept used to distinguish between the SDK app 127 and the terminal app 23. In the present embodiment, the app type may be identified based on a file name extension of the app file. Specifically, a file having the file name extension "jar" corresponds to an SDK app file, and a file having the file name extension "apk" corresponds to a terminal app file. Note that the install destination of an application program is determined by the app type. Thus, the file name of an app file may be regarded as information indicating the install destination of the corresponding application program.

If an SDK app file is included in the install package file to be installed, the remote install management unit 123 conveys an install request including the SDK app file to the SDK app management unit 124 (step S104). In turn, the SDK app management unit 124 executes an install process for installing the SDK app file. Note that the install process for installing the SDK app file is not limited to a specific process. After the install process is completed, the SDK application management unit 124 returns a response indicating the result of the install process to the remote install management portion unit 123 (step S105). The result of the install process may be information indicating whether the install process has been successfully executed, for example. Note that if the install process ends in failure, the present process may be terminated without executing step S106 and subsequent process steps.

Then, the remote install management unit 123 acquires controller information from the ROM 113, for example (step S106). In the present embodiment, the controller information is an example of identification information unique to the image forming apparatus 10 (controller 11). For example, the controller information may be a product number or a serial number. Also, the controller information may be generated based on a plurality of information items stored in the ROM 113. For example, the controller information may be a hash value generated based on the plurality of information items.

Then, if a terminal app file is included in the install package file to be installed, the remote install management unit 123 conveys an install request including the terminal app file and the controller information to the terminal access common unit 125 (step S107). Note that in some embodiments, the remote install management unit 123 may encrypt the controller information using an encryption key stored in the ROM 113, for example. In this case, in step S107, the encrypted controller information may be included in the install request. Note that the controller information is used in the case where a terminal app file is included in the install package file to be installed. Thus, in some embodiments, step S106 may only be executed when a terminal app file is included in the install package file to be installed.

In response to the install request from the remote install management unit 123, the terminal access common unit 125 executes a terminal app install process for installing the terminal app (step S108). Note that the terminal app install process is described in detail below. When the terminal app install process is completed, the terminal access common unit 125 returns a response indicating an install result of the terminal app install process to the remote install management unit 123 (step S109). The install result of the terminal app install process may be information indicating whether the terminal app install process has been successfully executed, for example.

Then, the remote install management unit 123 returns information indicating the install result to the install request unit 31 via the network communication unit 121 (steps S110 and S111). Note that if step S104 has been executed, the install result returned to the remote install management unit 123 in step S105 is included in the information returned to the install request unit 31 via the network communication unit 121. If step S107 has been executed, the install result returned to the remote install management unit 123 in step S109 is included in the information returned to the install request unit 31 via the network communication unit 121.

In turn, the install request unit 31 may prompt a display device of the client apparatus 30 to display the returned information. In this way, the user may be informed of the install results.

Figure 8:
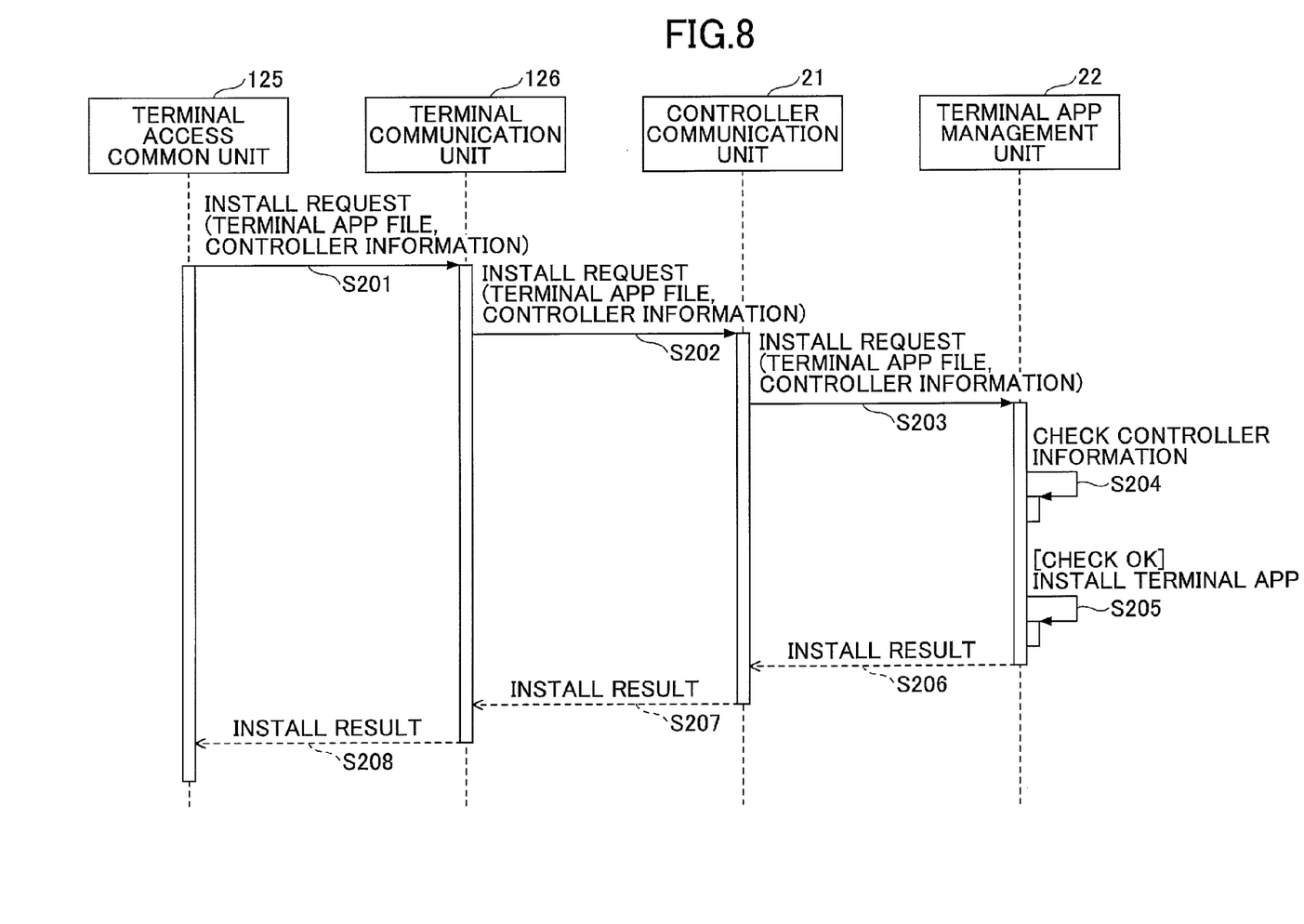
FIG. 8 is a sequence chart illustrating exemplary process steps of a terminal app install process.

In the following, step S108 is described in greater detail. FIG. 8 is a sequence chart illustrating exemplary process steps of the terminal app install process.

In step S201, the terminal access common unit 125 that receives the terminal app install request in step S107 of FIG. 6 requests the terminal communication unit 126 to transmit the terminal app install request to the information processing terminal 20. In turn, the terminal communication unit 126 transmits the terminal app install request including the terminal app file and the controller information to the information processing terminal 20 (step S202). Note that address information of the information processing terminal 20 may be stored in the HDD 114 or the NVRAM 115, for example. Also, the terminal app file and the controller information do not necessarily have to be transmitted at the same time. That is, in some embodiments, the terminal app file and the controller information associated with the same install request may be separately transmitted to the information processing terminal 20.

The install request transmitted from the terminal communication unit 126 is received by the controller communication unit 21 of the information processing terminal 20. In turn, the controller communication unit 21 conveys the received install request to the terminal app management unit 22 (step S203).

The terminal app management unit 22 checks the validity of the install request by comparing the controller information included in the install request and controller information included in the terminal app file (step S204). That is, the terminal app file includes controller information of the image forming apparatus 10 that cooperates with the information processing terminal 20 to which the terminal app is to be installed (the controller information is embedded in the terminal app file). In this way, the install destination of the terminal app 23 file may be restricted. Note that the controller information may be embedded into the terminal app file at the client apparatus 30, or the controller information may be embedded at an earlier stage before the install package file is downloaded to the client apparatus 30, for example. Also, in a case where the remote install management unit 123 is capable of recognizing the structure of the terminal app file, the controller information checking step S203 may be executed by the remote install management unit 123 after step 103, for example. In this case, if the configuration information included in the install request and the configuration information included in the terminal app file do not match, the present process may be cancelled without executing step S104 and the subsequent process steps.

Alternatively, the information to be compared with the controller information included in the install request may be stored in the secondary storage device 203 of the information processing terminal 20, for example. In this case, the controller information does not have to be included in each terminal app file.

If the controller information included in the install request matches the configuration information included in the terminal app file or the information stored in the information processing terminal 20, the terminal app management unit 22 installs the terminal app file in the information processing terminal 20 (step S205). In other words, if the comparison result of the controller information indicates a mismatch, the terminal app file is not installed in the information processing terminal.

Note that the two sets of controller information that are compared with each other do not necessarily have to be exactly the same value in order for the comparison result to indicate a match. That is, in some embodiments, the two sets of controller information that are compared with each other may be determined to match if the two sets of controller information have a predetermined relationship with each other, for example. The two sets of controller information having a predetermined relationship with each other may include a case where the controller information completely match as well as a case where the result of applying a predetermined conversion process to one controller information is the same as the other controller information, for example.

Then, the terminal application management unit 22 returns a response indicating the result of the install process of installing the terminal app file to the controller communication unit 21 (step S206). The result of the install process may be information indicating whether the install process has been successfully executed, for example. In turn, the controller communication unit 21 transmits the information indicating the result of the install process to the image forming apparatus 10 corresponding to the sender of the install request (step S207). Note that address information of the image forming apparatus 10 corresponding to the sender of the install request may be identified based on address information of the image forming apparatus 10 that is included in the install request transmitted from the image forming apparatus 10 in step S202, for example.

When the terminal communication unit 126 of the image forming apparatus 10 receives information indicating the result of the install process, the terminal communication unit 126 conveys the received information to the terminal access common unit 125 (step S208). This information is then conveyed to the remote install management unit 123 in step S109 of FIG. 6. Note that in some embodiments, when the information indicates that the install process of installing the terminal app 23 has been unsuccessful, the remote install management unit 123 may transmit a request to the SDK app management unit 124 to uninstall the SDK app 127 that has been installed in response to the install request issued in step S104, for example.

Then, the SDK application 127 and the terminal app 23 that have respectively been installed in the image forming apparatus 10 and the information processing terminal 20 in response to one install request may prompt the image forming apparatus 10 and the information processing terminal 20 to execute a process that involves cooperation between the image forming apparatus 10 and the information processing terminal 20. For example, the terminal app 23 may prompt the information processing terminal 20 to execute a process related to a GUI and display a screen to be operated by a user. The terminal app 23 may convey a process request according to an input to the screen to the SDK app 127 via the controller communication unit 21 and the terminal communication unit 126. In turn, the SDK app 127 may control the image forming apparatus 10 by having the image forming apparatus 10 execute a process according to the process request from the terminal app 23.

Note that in the above embodiments, an example is illustrated where the controller information is used upon installing the terminal app 23. However, in other embodiments, the controller information may be used when the SDK app 127 and the terminal app 23 are executed, for example. Specifically, the terminal app management unit 22 may store the controller information in association with the terminal app file in the secondary storage device 203 without executing the controller information checking step (step S204). Then, after the terminal app 23 is installed, the terminal app 23 of the terminal app file may include the controller information associated with the terminal app 23 in a process request that is transmitted to the SDK app 127 that has been installed along with the terminal app 23. In turn, the SDK app 127 or the SDK platform 122 that is to execute a process based on the process request may proceed to execute the process according to the process request if the controller information included in the process request matches the controller information of the image forming apparatus 10. In this way, the image forming apparatus 10 with which the terminal app 23 may cooperate may be restricted. That is, the image forming apparatus 10 with which the information processing terminal 20 may cooperate may be restricted.

Also, in the embodiment described above, the install package file is received (input) via a network. However, the present invention is not limited to such an arrangement, and in other examples, the install package file may be input from a recording medium readable by the image forming apparatus 10 such as the SD card 80, for example.

Also, data described as a file in the above embodiment may be in a format other than a file, for example.

As described above, according to an aspect of the present embodiment, when an install request is issued from the client apparatus 30, a program may be installed onto the image forming apparatus 10 and also the information processing terminal 20 that cooperatively executes a process with the image forming apparatus 10 as a chain reaction. In this way, efficiency may be improved in installing programs to a plurality of information processing apparatuses that cooperatively execute a process, and the workload of the operator may be reduced.

Note that in some embodiments, the information processing terminal 20 may be configured to receive the install request from the client apparatus 30 instead of the image forming apparatus 10, for example. In this case, the information processing terminal 20 may install the terminal app 23 and send a request to the image forming apparatus 10 to install the SDK app 127. That is, in FIGS. 6 and 8, the image forming apparatus 10 may be replaced by the information processing terminal 20.

Also, an aspect of the present invention may be applied to two or more information processing apparatuses that do necessarily have the relationship where one of the information processing apparatuses acts as an operation unit of the other. For example, an aspect of the present invention may be applied to any system such as a general client-server system including a plurality of information processing apparatuses that cooperatively execute a process via a network. Also, an aspect of the present invention may relate to causing programs to be installed onto three or more information processing apparatuses as chain reactions, for example.

Note that the image forming apparatus 10 of the above-described embodiment is an example of a first information processing apparatus. The information processing terminal 20 is an example of a second information processing apparatus. The network communication unit 121 is an example of an input unit. The SDK app management unit 124 is an example of a first install unit. The terminal communication unit 126 is an example of a transmission unit. The terminal app management unit 22 is an example of a second install unit.

Although the present invention has been described above with reference to certain illustrative embodiments, the present invention is not limited to these embodiments, and numerous variations and modifications may be made without departing from the scope of the present invention.

The present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any non-transitory storage medium for storing processor readable code such as a floppy disk, a hard disk, a CD ROM, a magnetic tape device or a solid state memory device. The non-transitory storage medium can comprise any computer-readable medium except for a transitory, propagating signal.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of recording a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU and the RAM may operate as a physical memory or a primary memory of the apparatus, while the HDD may operate as a secondary memory of the apparatus.

The present application is based on and claims the benefit of priority of Japanese Patent Application No. 2014-051847 filed on Mar. 14, 2014, the entire contents of which are hereby incorporated by reference.

What is claimed is:

1. An information processing system comprising:
 a first information processing apparatus and a second information processing apparatus that are interconnected via a network;
 wherein the first information processing apparatus includes
  an input unit configured to input a group of programs;
  a first install unit configured to install a first program of the input group of programs onto the first information processing apparatus; and
  a transmission unit configured to transmit a second program of the input group of programs to the second information processing apparatus; and
 wherein the second information processing apparatus includes
  a second install unit configured to install the second program transmitted from the transmission unit onto the second information processing apparatus,
 wherein the first program and the second program are identified based on information indicating an install destination of each program that is included in the group of programs input by the input unit;
 the first install unit installs the first program that is identified based on the information indicating the install destination onto the first information processing apparatus; and
 the transmission unit transmits the second program that is identified based on the information indicating the install destination to the second information processing apparatus.

2. The information processing system as claimed in claim 1, wherein
 the first program prompts the first information processing apparatus to execute a predetermined process; and
 the second program prompts the second information processing apparatus to execute a cooperative process in cooperation with the predetermined process.

3. The information processing system as claimed in claim 2, wherein
 the transmission unit transmits identification information unique to the first information processing apparatus to the second information processing apparatus in association with transmitting the second program to the second information processing apparatus; and
 the second install unit installs the second program onto the second information processing apparatus in a case where the identification information received from the transmission unit has a predetermined relationship with at least one of information included in the second program and information stored in the second information processing apparatus.

4. The information processing system as claimed in claim 1, wherein one of the first information processing apparatus and the second information processing apparatus acts as an operation unit of another one of the first information processing apparatus and the second information processing apparatus.

5. An information processing method implemented by an information processing system including a first information processing apparatus and a second information processing apparatus that are interconnected via a network, the information processing method comprising:

an input step executed by the first information processing apparatus for inputting a group of programs;
a first install step executed by the first information processing apparatus for installing a first program of the input group of programs onto the first information processing apparatus;
a transmission step executed by the first information processing apparatus for transmitting a second program of the input group of programs to the second information processing apparatus; and
a second install step executed by the second information processing apparatus for installing the second program transmitted by the transmission step onto the second information processing apparatus,
wherein the first program and the second program are identified based on information indicating an install destination of each program that is included in the group of programs input in the input step;
the first install step includes installing the first program that is identified based on the information indicating the install destination onto the first information processing apparatus; and
the transmission step includes transmitting the second program that is identified based on the information indicating the install destination to the second information processing apparatus.

6. The information processing method as claimed in claim 5, wherein
the first program prompts the first information processing apparatus to execute a predetermined process; and
the second program prompts the second information processing apparatus to execute a cooperative process in cooperation with the predetermined process.

7. The information processing method as claimed in claim 6, wherein
the transmission step includes transmitting identification information unique to the first information processing apparatus to the second information processing apparatus in association with transmitting the second program to the second information processing apparatus; and
the second install step includes installing the second program onto the second information processing apparatus in a case where the identification information transmitted by the transmission step has a predetermined relationship with at least one of information included in the second program and information stored in the second information processing apparatus.

8. The information processing method as claimed in claim 5, wherein one of the first information processing apparatus and the second information processing apparatus acts as an operation unit of another one of the first information processing apparatus and the second information processing apparatus.

9. A computer program product comprising a non-transitory computer-readable medium having a computer program recorded thereon that is executable by an information processing apparatus that is connected to another information processing apparatus via a network, the computer program when executed causing the information processing apparatus to perform:
an input step of inputting a group of programs;
an install step of installing a first program of the input group of programs onto the information processing apparatus; and
a transmission step of transmitting a second program of the input group of programs to the other information processing apparatus and prompting the other information processing apparatus to install the second program,
wherein the first program and the second program are identified based on information indicating an install destination of each program that is included in the group of programs input in the input step;
the install step includes installing the first program that is identified based on the information indicating the install destination onto the information processing apparatus; and
the transmission step includes transmitting the second program that is identified based on the information indicating the install destination to the other information processing apparatus.

10. The computer program product as claimed in claim 9, wherein
the first program prompts the information processing apparatus to execute a predetermined process; and
the second program prompts the other information processing apparatus to execute a cooperative process in cooperation with the predetermined process.

11. The computer program product as claimed in claim 10, wherein
the transmission step includes transmitting identification information unique to the information processing apparatus to the other information processing apparatus in association with transmitting the second program to the other information processing apparatus; and
the other information processing apparatus installs the second program in a case where the identification information transmitted by the transmission step has a predetermined relationship with at least one of information included in the second program and information stored in the second information processing apparatus.

12. The computer program product as claimed in claim 9, wherein a first one of the information processing apparatus and the other information processing apparatus acts as an operation unit of a second one of the information processing apparatus and the other information processing apparatus.

* * * * *